Dec. 13, 1932.   W. C. O'LEARY   1,890,655
VACUUM WALL RECEPTACLE
Original Filed Feb. 14, 1927
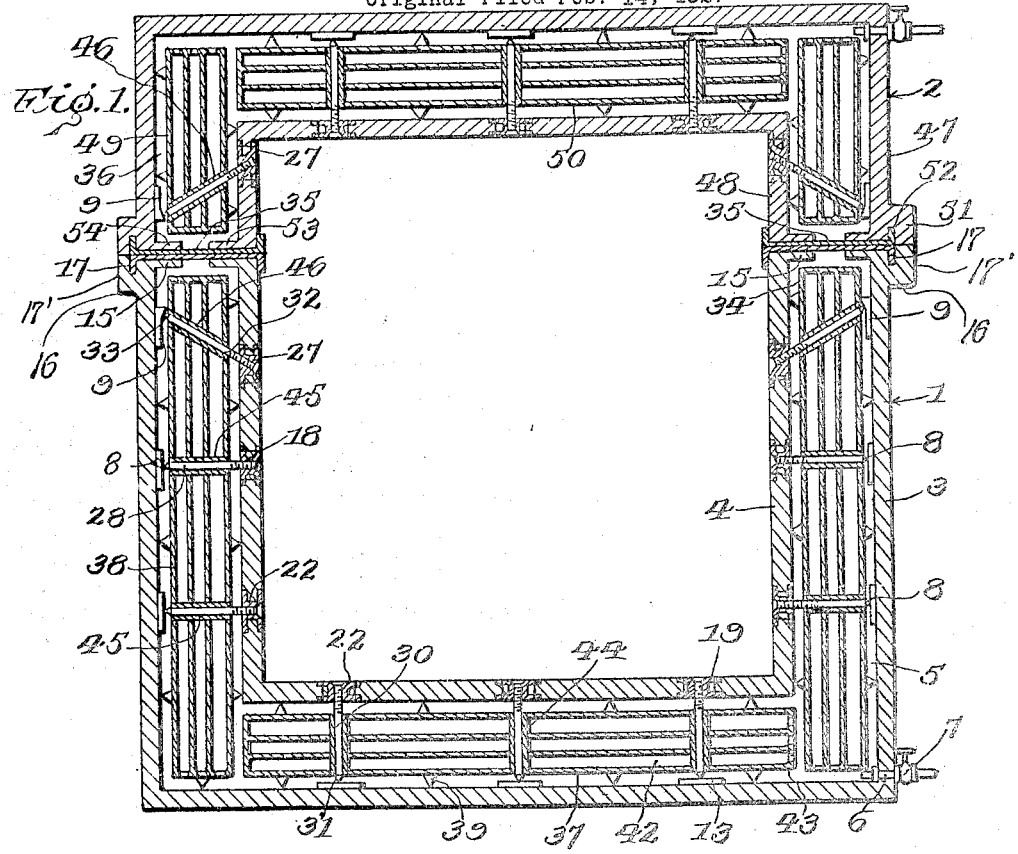
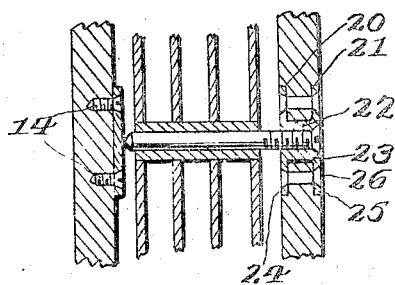
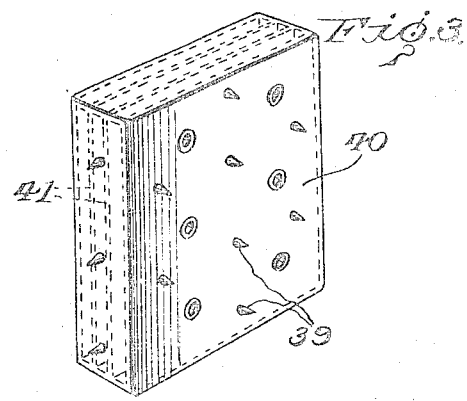
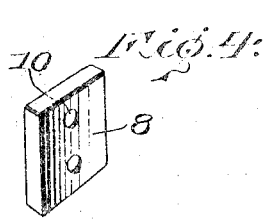
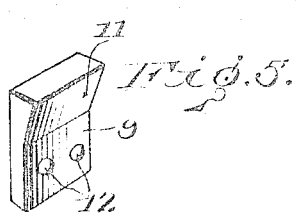
INVENTOR.
William C. O'Leary,
BY
Geo. F. Kimmel, ATTORNEY.

Patented Dec. 13, 1932

1,890,655

UNITED STATES PATENT OFFICE

WILLIAM C. O'LEARY, OF WASHINGTON, DISTRICT OF COLUMBIA

REISSUED
NOV 5 - 1940

VACUUM WALL RECEPTACLE

Application filed February 14, 1927, Serial No. 168,102. Renewed September 18, 1931.

The invention relates to a vacuum wall receptacle, and has for its object to provide, in a manner as hereinafter set forth, a receptacle of such class constructed and arranged to provide substantially perfect insulation from heat whereby the contents of the receptacle will be protected from the effects of heat and under such conditions preserving such contents for an indefinite period.

A further object of the invention is to provide, in a manner as hereinafter set forth, a vacuum wall receptacle provided with means for exerting and resisting pressure on and from the walls of the vacuum space to prevent the collapsing and bending of such walls.

A further object of the invention is to provide, in a manner as hereinafter set forth, a vacuum wall receptacle provided within the vacuum space thereof, as well as being spaced from the walls of such space, heat insulating means.

A further object of the invention is to provide, in a manner as hereinafter set forth, a vacuum wall receptacle, of that type including an open top body portion and a cover therefor, and with the body portion and cover each formed with a vacuum space closed by a sealing strip of low conductivity whereby when the strip carried by the cover is positioned against the strip carried by the body portion a substantially continuous vacuum space is provided throughout the cover and body portion, or in other words the receptacle is formed throughout with a substantially continuous vacuum wall.

A further object of the invention is to provide, in a manner as hereinafter set forth, a vacuum wall receptacle provided within the vacuum space thereof, as well as being spaced from the walls of such space, with a series of opposed, spaced heat absorbing elements.

Further objects of the invention are to provide, in a manner as hereinafter set forth, a vacuum wall receptacle which is comparatively simple in its construction and arrangement, strong, durable, compact, thoroughly efficient in its use, readily assembled, and comparatively inexpensive to manufacture.

With the foregoing and other objects in view the invention consists of the novel construction, combination and arrangement of parts as hereinafter more specifically described, and illustrated in the accompanying drawing wherein is shown an embodiment of the invention, but it is to be understood that changes, variations and modifications can be resorted to which fall within the scope of the claims hereunto appended.

In the drawing wherein like reference characters denote corresponding parts throughout the several views:

Figure 1 is a vertical sectional view of a vacuum wall receptacle in accordance with this invention.

Figure 2 is a fragmentary view, in section and upon an enlarged scale, of parts of the body portion of the receptacle.

Figure 3 is a perspective view of one of the heat absorbing elements.

Figure 4 is a perspective view of an abutment plate.

Figure 5 is a perspective view of another form of abutment plate employed in the receptacle.

The receptacle can be of any suitable contour and formed of a body portion and a cover. As showing an embodiment of the invention the receptacle is illustrated, by way of example of polygonal contour and is so constructed as to provide a substantially continuous vacuum wall throughout the top, bottom, and sides and ends thereof. The body portion is referred to generally by the reference character 1 and the cover generally by the reference character 2, and which provide a storage chamber.

The body portion comprises an outer section 3 and an inner section 4 of like contour, but with the inner section 4 of less width, height and breadth than the width, height and breadth of the outer section 3. The upper ends of the sections 3 and 4 are arranged in alignment and the section 4 is spaced from the section 3 to provide a chamber extending around the bottom, sides and ends of the section 4. Such chamber is indicated at 5 and provides a vacuum space to be hereinafter referred to. The chamber 5 can be of any suitable width, depending upon the position of the section 4 relative to the section 3.

The section 3 is imperforate, other than formed near its bottom with an opening 6, to provide for connecting therewith a valve controlled air discharge pipe 7 adapted to be connected with a pump for creating the vacuum in the space 5. It will be understood that the valve controlled pipe 7 can be positioned at any point on the section 3 as desired.

Each side wall of the section 3, only two of which are shown, has secured to its inner face a lower and an intermediate row of abutment plates 8 and an upper row of abutment plates 9. The rows of plates 8 are spaced from each other and the row of plates 9 are spaced from the intermediate row of plates 8. The number of plates of each row can be as desired, but preferably three are employed. The plates 8 are square in contour and formed with a pair of spaced openings 10 for the passage of suitable holdfast devices to fixedly secure the plates to the inner face of the side and end walls of the section 3. The plates 8 are of any suitable thickness. The plates 9 are of rectangular contour and each has the upper part thereof bevelled as at 11 and with the bevel formed on that face which opposes the inner face of the walls of the section 4. The bevel 11 overhangs the lower portion of the plate 9 and the latter is formed with openings 12 for the passage of holdfast devices to secure the plates 9 to the inner face of the walls of the section 3. The upper face or inner face of the bottom of the section 3 is formed with a pair of outer and an intermediate row of abutment plates 13. The plates of each row are arranged in spaced relation and preferably the number of plates of a row is three. The plates 13 correspond in contour to the plates 8 or in other words the plates 13 are constructed in the same manner as the plates 8. The holdfast devices for securing the plates 8 in position are indicated at 14. The holdfast devices for securing the plates 9 and 13 in position are not shown but holdfast devices similar to the holdfast devices 14 are employed for securing the plates 9 and 13 to the inner face of the section 3.

Coextensive with the top of each section is a right angularly disposed inwardly extending flange 15, which in cross section is of a length slightly less than half the width of the chamber 5. The section 3 at the top thereof is formed with an angle shaped rib 16, which is coextensive with said top and includes a horizontal and a vertical portion and with the vertical portion spaced from the outer face of the section 3 to provide a pocket 17 which is coextensive with the section 3. The vertical portion 17' extends slightly above the top edge of the section 3. The function of the pocket 17 will be presently referred to. Owing to the extending of the vertical portion of the rib 16 above the top edge of the section 3, the inner side wall of said pocket is of less height than the outer side wall thereof, see Figure 1.

The walls and bottom of the section 4 are provided with parallel rows of spaced openings. The number of rows of openings formed in the walls of the section 4 correspond in number to the number of rows of abutment plates carried by the walls of the section 3. The number of rows of openings in the bottom of the section 4 correspond in number to the number of rows of abutment plates 13 carried by the bottom of the section 3. The openings of the rows formed in the walls of the section 4 are indicated at 18 and the openings formed in the bottom of the section 4 are indicated at 19.

The upper rows of openings formed in the walls of the section 4 are arranged below the rows of abutment plates 9, but the other rows of openings formed in the walls of the section 4 are arranged in alignment with the rows of abutment plates 8, and the rows of openings formed in the bottom of the section 4 are arranged in alignment with the rows of abutment plates 13. With reference to Figure 2 the section 4 has both faces thereof provided with mortises indicated at 20, 21 and each mortise 20 surrounds the inner end of an opening and each mortise 21 surrounds the outer end of an opening. Mounted in each opening provided in the section 4, other than the openings of the upper rows of openings formed in the walls of said section 4, is a threaded sleeve 22 having a countersunk portion 23 at its outer end and further having each end formed with a lateral flange and with said flanges indicated at 24, 25. The flange 24 is seated in the mortise 20 and the flange 25 in mortise 21. The flanges are connected together by holdfast devices 26 and which extend through the body portion of the section 4.

The sleeves arranged in the upper rows of openings formed in the walls of the section 4 are constructed in the same manner as the sleeves 22 with this exception that the sleeve is constructed to form an upwardly inclined bore. The sleeves mounted in the upper row of openings formed in the walls of the section 4 are indicated at 27, and said sleeves 27 are secured to the receptacle 4 in the same manner as the sleeves 22. The inclination of the bore or opening formed by the sleeves 27 is towards the bevelled upper portions of the plates 9. The sleeves 27 are provided with threads in the same manner as the sleeves 22. Extending through each of the sleeves 22, which are secured in the walls of the section 4, are threaded, cylindrical members 28 having heads countersunk in the sleeves and formed with pointed ends 29 which abut against the plates 8. Extending through the sleeves 22 carried by the bottom of the section 4, as well as threadably engaging such sleeves, are cylindrical members 30, having pointed ends 31 which abut against the plate 13. Extending through the sleeves 27, as well as having threaded engagement therewith, are upwardly inclined cylindrical members 32, having pointed ends 33 which abut against the bevelled portions 11 of the plates 9. The members 28, 30 and 32 in connection with the plates 8, 9 and 13 provide means for maintaining the sections 3 and 4 in spaced relation and exerts and resists pressure. The cylindrical members are not compressible and they have a minimum contact relative to the sections 3 and 4, more particularly the section 3 so that little or no heat can be conveyed. The braces 8, 9, 13, sleeves 22 and 27 and the threaded cylindrical members provide what may be termed an intrawall structure and form the body portion 1 as a unit, or in other closed body portion 40 provided with a plurality of spaced partitions 41 providing a series of compartments 42 forming vacuum spaces. The body portion 40 at one end is formed with exhaust ports 43 each associated with a compartment 42 to provide for the exhaust of air therefrom to form a vacuum in connection with the chamber 5. The body portion 40 of the element 37 is formed with transversely extending sleeves 44 for the passage of the cylindrical members 30 whereby the openings provided by each sleeve is closed to the compartments 42. Each of the elements 38 is formed with transversely extending sleeves 45 and upwardly inclined sleeves 46 for the passage of the cylindrical members. The sleeves 44 and 45 in connection with the cylindrical members prevent the elements 37 and 38 from shifting. The body portion 40, as well as the partitions 41, is formed from perfect insulation from heat whereby the contents thereof will be protected from the effects of heat and preserved for an indefinite period, as well as setting up a receptacle having a substantially continuous vacuum space extending entirely throughout the same, that is through the body portion and cover of the receptacle and further whereby with the heat insulating means arranged in the vacuum space assists in the preserving of the contents of the receptacle, and therefore it is thought the many advantages of a vacuum wall receptacle, in accordance with this invention can be readily understood, and although the preferred embodiment of the invention is as illustrated and described, yet it is to be understood that changes in the details of construction can be had, which will fall within the scope of the invention as claimed.

What I claim is:

1. In a receptacle means to provide a chamber surrounded by a vacuum space, an intra-wall structure for maintaining the walls in said space in position by pressure, and a heat insulating means arranged within said space and having spaced pointed barbs abutting the inner faces of said walls whereby said means is spaced from said walls.

2. In a receptacle means to provide a chamber surrounded by a vacuum space, a pressure exerting and resisting intra-wall structure for maintaining the walls of said space in position, and a heat insulating means arranged within said space, spaced from the walls thereof and having said structure extending therethrough.

3. In a receptacle means to provide a chamber surrounded by a vacuum space having opposed walls, an intra-wall structure carried by one of said walls, extending across said space and having points for minute contact with the other of said walls for maintaining these latter in position, and a heat insulating means arranged within said space, spaced from the walls thereof and having openings for the passage of said structure.

4. In a receptacle means to provide a chamber surrounded by a vacuum space, a pressure exerting intra-wall structure extending across said space for maintaining the walls of said space in position by pressure, a heat insulating means arranged within said space, spaced from the walls thereof and said means including vacuum spaces and having openings for the passage of said structure therethrough.

5. A vacuum wall receptacle comprising means to provide a storage chamber surrounded at its top, bottom and sides by a substantially continuous vacuum space, and pressure exerting and resisting intra-wall structure for maintaining the walls of said space in position, and means arranged within said vacuum space throughout and spaced from the walls thereof to provide heat insulators having spaced openings for the passage of said structure.

6. A receptacle comprising, a body portion open at one end and formed with a pair of wall forming members, each having a free edge, one of said members being arranged within the other in spaced relation to provide a space therebetween open adjacent said free edges, an element of low conductivity arranged at said free edges to close said space, a plurality of spaced plates secured to the inner face of the outer member of said pair, a plurality of threaded sleeves extending through the inner member of said pair and disposed in opposed relation to said plates, and a plurality of elongated elements extending through said sleeves in threaded engagement therewith, said elongated elements extending across said space and abutting the plates for locking said members together to form a unit.

7. A receptacle comprising, a body portion open at one end and formed with a pair of wall forming members, each having a free edge, one of said members being arranged within the other in spaced relation to provide a space therebetween open adjacent said free edges, an element of low conductivity arranged at said free edges to close said space, a plurality of spaced plates secured to the inner face of the outer member of said pair, a plurality of threaded sleeves extending through the inner member of said pair and disposed in opposed relation to said plates, and a plurality of elongated elements extending through said sleeves in threaded engagement therewith, said elongated elements extending across said space and abutting the plates for locking said members together to form a unit, the ends of said sleeves being flush with the inner and outer faces of said inner member, said elongated members being formed with pointed outer ends to provide concentrated, biting contacts with said plates.

8. In a receptacle, opposed means to provide an open top chamber surrounded by a space open at its edge, an incompressible intra-wall structure for bracing and fixing the walls of said space in immovable spaced relation, a heat insulating means supported within said space and free of contact with the walls thereof, and a thin structure of very low conductivity having tenacity to resist air pressure, impenetrable to air and providing a heat insulating element for closing said edge to provide a vacuum space and forming an edge insulation.

9. In a receptacle, opposed means to provide an open top chamber surrounded by a space having opposed walls and open at its edge, an intra-wall structure carried by one of said walls, extending across said space and having points for minute contact with the other of said walls for maintaining the walls in position, a heat insulating means arranged within said space, spaced from the walls thereof and having openings for passage of said structure, and a thin fibrous structure of material of low conductivity impenetrable to air for closing said edge to provide a vacuum space and forming an edge insulation.

10. In a receptacle, opposed means to provide an open top chamber surrounded by a vacuum space, an incompressible intra-wall structure extending across said space for maintaining the walls of said space in position, a heat insulating means arranged within said space and spaced from the walls thereof, said heat insulating means consisting of a plural number of thin stiff sheets having polished reflecting surfaces, said sheets being spaced from each other and extending approximately the length and width of the hollow space, said heat insulating means having openings for the passage of the intra-wall structure therethrough.

11. In a receptacle, opposed means to provide an open top chamber surrounded by a vacuum space having opposed walls, an intrawall structure carried by one of said walls, extending across said space and having points for minute contact with the other of said walls for maintaining the walls in position, a heat insulating means arranged within said space, spaced from the walls thereof and having openings for the passage of said structure, said opposed means including flanges extending inwardly at an edge of the vacuum space for reducing the width of the said edge and providing spaced supports and a sealing strip mounted on said supports, said strip being a thin structure of very low conductivity, impenetrable to air, that part of said sealing strip between the flanges closing such edge of the vacuum space and acting as an edge insulation therefor.

12. In a receptacle, means to provide an open top chamber surrounded by a hollow space having opposed walls and open at its edge, an incompressible intrawall structure extending across said space for bracing and fixing said opposed walls in a stable spaced relation, said intrawall structure being connected to one of and engaging the other of the opposed walls, means for reducing the width of the opening at said edge and providing a narrow continuous open edge for said hollow space, a soft element of very low conductivity for closing said narrow open edge, said element making an edge heat insulation for the wall surrounding the closed space, said closed space when exhausted of air becoming a vacuum space having opposed walls, said opposed walls forming a vacuum wall surrounding said open top chamber.

13. In a receptacle, a structure including means to provide an open top chamber surrounded by a hollow space having opposed walls and open at its edge, means for reducing the width of said open edge and providing a continuous narrow open edge for said hollow space, a thin element of very low heat conductivity for closing said narrow open edge, said element providing an edge heat insulation for the wall surrounding the closed space, an incompressible intrawall structure extending across said space for bracing and fixing the opposed walls thereof in a stable spaced relation, said closed space when evacuated of air providing a vacuum space having opposed walls, said opposed walls forming a vacuum wall surrounding the open top chamber, a cover for said open top chamber of like form as and oppositely disposed with respect to said structure, said cover including vacuum wall forming means and bracing means similar to that of said structure, said cover when closed forming a continuation of the open top chamber and in connection with said structure providing a closed chamber centrally of the receptacle, the said closed edge of said structure, when the cover is closed meeting a like edge on the latter thereby providing an insulated wall entirely surrounding said central chamber, continuous heat insulating means and an almost continuous vacuum space insulation.

14. In a receptacle, a structure including means to provide an open top chamber surrounded by a hollow space having opposed walls and open at its edge, an incompressible means for bracing and fixing said opposed walls in stable spaced relation, means for reducing the width of the opening at said edge and providing a narrow continuous open edge for said hollow space, an element of very low conductivity for closing said narrow open edge, said element making an edge heat insulation for the wall surrounding the closed space, a heat insulating means arranged within said space, said heat insulating means consisting of a plural number of thin stiff sheets having polished reflecting surfaces, said sheets being spaced from each other and extending approximately the length and width of the hollow space, said closed space when evacuated of air providing a vacuum space having opposed walls, said opposed walls with said closing element forming a vacuum wall surrounding the open top chamber, a cover for said open top chamber of the form as and oppositely disposed with respect to said structure, said cover including vacuum wall forming means, bracing means and heat insulating means similar to that of said structure, said cover when closed providing in connection with said structure continuous heat insulation around a central space, said heat insulation consisting of almost continuous vacuum space heat insulation together with the additional heat insulating means arranged in said vacuum space for reducing the radiation of heat across said space.

15. In a receptacle, means to provide an open top chamber surrounded by a vacuum space having opposed walls, an element of very low heat conductivity forming an edge closure and edge heat insulation for the wall enclosing said vacuum space, an incompressible intrawall structure attached to one of said opposed walls and making contact with the other wall for bracing said opposed walls against air pressure and for fixing said opposed walls in a stable spaced relation, a heat insulating body arranged within said vacuum space and approximately filling said space, said heat insulating body having supports based on the wall surrounding said vacuum space.

16. In a receptacle, an open top chamber surrounded by a vacuum space having opposed walls, an element of very low heat conductivity forming an edge closure and edge heat insulation for the wall enclosing said vacuum space, an intrawall structure within said vacuum space, said structure comprising pointed rods systematically distributed through said space and attached to one of said opposed walls and making minute contact within the other wall, a heat insulating body arranged within said vacuum space, said body having a multiplicity of cells, providing a multiplicity of subordinate vacuum spaces within said vacuum space.

In testimony whereof, I affix my signature hereto.

WILLIAM C. O'LEARY.